US007243127B2

(12) United States Patent
Tabayoyon, Jr. et al.

(10) Patent No.: US 7,243,127 B2
(45) Date of Patent: Jul. 10, 2007

(54) NETWORK-BASED DOCUMENT DELIVERY SYSTEM WITH RECEIPT AND DISPLAY VERIFICATION

(75) Inventors: Alfred T. Tabayoyon, Jr., Tigard, OR (US); Randy L. Prakken, Canby, OR (US); Glenn F. Widener, Portland, OR (US)

(73) Assignee: Swiftview, Inc., Tualatin, OR (US)

( * ) Notice: Subject to any disclaimer, the term of this patent is extended or adjusted under 35 U.S.C. 154(b) by 947 days.

(21) Appl. No.: 09/974,624

(22) Filed: Oct. 9, 2001

(65) Prior Publication Data

US 2002/0042838 A1    Apr. 11, 2002

Related U.S. Application Data

(60) Provisional application No. 60/239,691, filed on Oct. 11, 2000.

(51) Int. Cl.
*G06F 15/16* (2006.01)
(52) U.S. Cl. .................... 709/206; 709/227; 709/219
(58) Field of Classification Search ........ 709/217–229, 709/204–206; 715/500.1–501; 707/1–10; 713/200–201
See application file for complete search history.

(56) References Cited

U.S. PATENT DOCUMENTS 5,818,447 A * 10/1998 Wolf et al. ................. 715/752
5,850,520 A * 12/1998 Griebenow et al. ......... 709/206
6,209,030 B1 * 3/2001 Ohashi ....................... 709/219
6,212,534 B1 * 4/2001 Lo et al. ..................... 715/511
6,237,099 B1 * 5/2001 Kurokawa ...................... 707/9
6,243,722 B1 * 6/2001 Day et al. ................... 715/512
6,266,703 B1 * 7/2001 Clark et al. ................. 709/237
6,314,454 B1 * 11/2001 Wang et al. ................ 709/206
6,360,221 B1 * 3/2002 Gough et al. ................ 707/10
6,360,254 B1 * 3/2002 Linden et al. .............. 709/219
6,789,108 B1 * 9/2004 McMillan ................... 709/206
6,802,000 B1 * 10/2004 Greene et al. .............. 713/168
6,839,741 B1 * 1/2005 Tsai .......................... 709/217

* cited by examiner

*Primary Examiner*—David Wiley
*Assistant Examiner*—Joseph E. Avellino
(74) *Attorney, Agent, or Firm*—Wood, Herron & Evans, LLP (57) ABSTRACT

A document delivery system transmits a document file from a sender computer to a server computer. The server computer then stores the document file at a particular network address, sends a message to the receiver computer indicating the network address of the document file, and later forwards the document file to the receiver computer when the receiver computer requests the document file at that network address. Viewer software running on the receiver computer processes the received document file to produce a display of the document it describes after which the viewer software returns data to the server computer indicating that it successfully displayed the document. The server computer logs a record of the successful receipt and display of the document and makes that record accessible to the sender computer. If the viewer is unable to successfully display the document, it does not return the indicating data to the server.

17 Claims, 7 Drawing Sheets

FIG. 1

SEND DOCUMENT

Set Document Properties

Title [Memo 2] /53

54.
55. ☒ Return Receipt Required?
56. ☒ Viewer Sign-in Required?
57. ☐ Prevent Printing?
    ☒ Password Required?  [alakazam] /58

Identify and Notify Recipients

Type email addresses separated by commas:

To: [bob@abc.com, john@abc.com] /59

Subject: [Sales Strategy Memo] /60

Message:
[Dear Bob and John,
   Here's the draft memo on sales strategy you requested. Have a look at it and send any comments you have back to me, Regards,
   Sara] /61

62 [CANCEL]  [SEND] /63

SwiftView Sign-in

| USER NAME: | bobjones /82 | SIGN-IN /84 |
| --- | --- | --- |
| PASSWORD: | bobspassword /83 | CANCEL /85 |
| | If new user press here: | NEW USER /86 |

Document Password

Enter Document Password: [**********] /89

[ENTER] /90  [CANCEL] /91

NOTE

Send return receipt upon viewing document?

Sara Jones would like to know that you have viewed the document "Sales Strategy".

- If you click Yes
  The document will be displayed and we will send the return receipt.

- If you click No
  No return receipt will be sent but you cannot view the document. Your web browser goes to the previous web page (if there is one).

[NO] /96   [YES] /94

| Inbox | Outbox | Account | Sign Out | |
|---|---|---|---|---|

Hide Checked Mail /136　　　137\ UnHide All Mail

| | From | Subject | Received | Document Title |
|---|---|---|---|---|
| ☒ | Sara Jones <sara@home.com> | Sales meeting | 02/15/2000 09:39.04 | Memo 3 |
| ☐ | Bob Smith <bob@yahoo.com> | New floorplan | 02/20/2000 10:15.59 | Drawing |

| Inbox | Outbox | Account | Sign Out | |
|---|---|---|---|---|

Delete Checked Document /149　　　150\ Send A Document

| | Document Title | Date/Time | Total Recipients | Return Receipts Received | | Comments |
|---|---|---|---|---|---|---|
| ☒ | Sales Results | 02/15/2000 09:39.04 | 4 | 1 | Properties | C |
| ☐ | Memo 1 | 02/16/2000 14:02.27 | 3 | 0 | Properties | |
| ☐ | Org. Chart | 02/20/2000 10:15.59 | 10 | 0 | Properties | C |
| ☐ | Memo 2 | 03/01/2000 15:12.50 | 2 | 2 | Properties | |

NETWORK-BASED DOCUMENT DELIVERY SYSTEM WITH RECEIPT AND DISPLAY VERIFICATION

CROSS-REFERENCE TO RELATED APPLICATIONS

The present application is a continuation-in-part of copending provisional application Serial No. 60/239,691, filed Oct. 11, 2000.

BACKGROUND OF THE INVENTION

1. Field of the Invention

The present invention relates in general to systems for transmitting document files between computers, and in particular to a document delivery system that provides a sender with verification that a receiver has successfully received and displayed a document.

2. Description of Related Art

U.S. Pat. No. 5,790,790 entitled "ELECTRONIC DOCUMENT DELIVERY SYSTEM IN WHICH NOTIFICATION OF SAID ELECTRONIC DOCUMENT IS SENT TO A RECIPIENT THEREOF", issued Aug. 4, 1998 to Smith et al, describes a document delivery system in which a sender computer sends a file describing a document to a server computer. The server computer stores the document file at a network address and then sends an email notification to a receiver computer referencing the network address of the document file. The receiver computer can then use conventional file transfer protocol to download the document file from server computer. The receiver computer may then process the document file to produce a display of the document it describes. The server computer maintains a log indicting whether email was sent to the receiver and indicating whether the server forwarded the document to the receiver. The sender computer can access the log to determine whether the server computer forwarded the document file to the receiver computer.

In many applications it would be beneficial for a sender computer to be able to determine not only whether the server computer sent a document file to a receiver computer, but also whether the receiver computer actually received the document file and successfully displayed an image of the document it describes. A document file can be corrupted in transit between the sender computer and server computer or between the server computer and the receiver computer. Also although the receiver computer may receive an uncorrupted document file, software running on the receiver computer may be corrupted and unable to display the document.

What is needed is a document delivery system providing a means for enabling a sender computer transmitting a document file to a receiver computer via a server computer to determine whether the receiver computer has successfully received the document file and successfully displayed the document it represents.

BRIEF SUMMARY OF THE INVENTION

In a document delivery system in accordance with the invention, a sender computer transmits a document file to a server computer. The server computer then stores the document file at a particular network address, sends a message to the receiver computer indicating the network address of the document file, and later forwards the document file to the receiver computer when the receiver computer requests the document file at that network address.

In accordance with one aspect of the invention, viewer software running on the receiver computer processes the received document file to produce a display of the document it describes. After successfully displaying the document, the viewer software returns data to the server computer indicating that it successfully displayed the document. The server computer logs a record of the successful receipt and display of the document and makes that record accessible to the sender computer. If the viewer is unable to successfully display the document, it does not return the indicating data to the server. Thus the sender computer is able to determine from the server's logged record whether the receiver computer has successfully received and displayed the document.

It is accordingly an object of the invention to provide a network-based document delivery system by which a sender computer sends a document file to a receiver computer via a server computer so that the receiver computer can process the document file to display the document it describes.

It is another object of the invention to provide a mechanism by which the sender computer is able to determine whether the receiver computer successfully displayed the document.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DETAILED DESCRIPTION OF THE INVENTION

Figure 1:
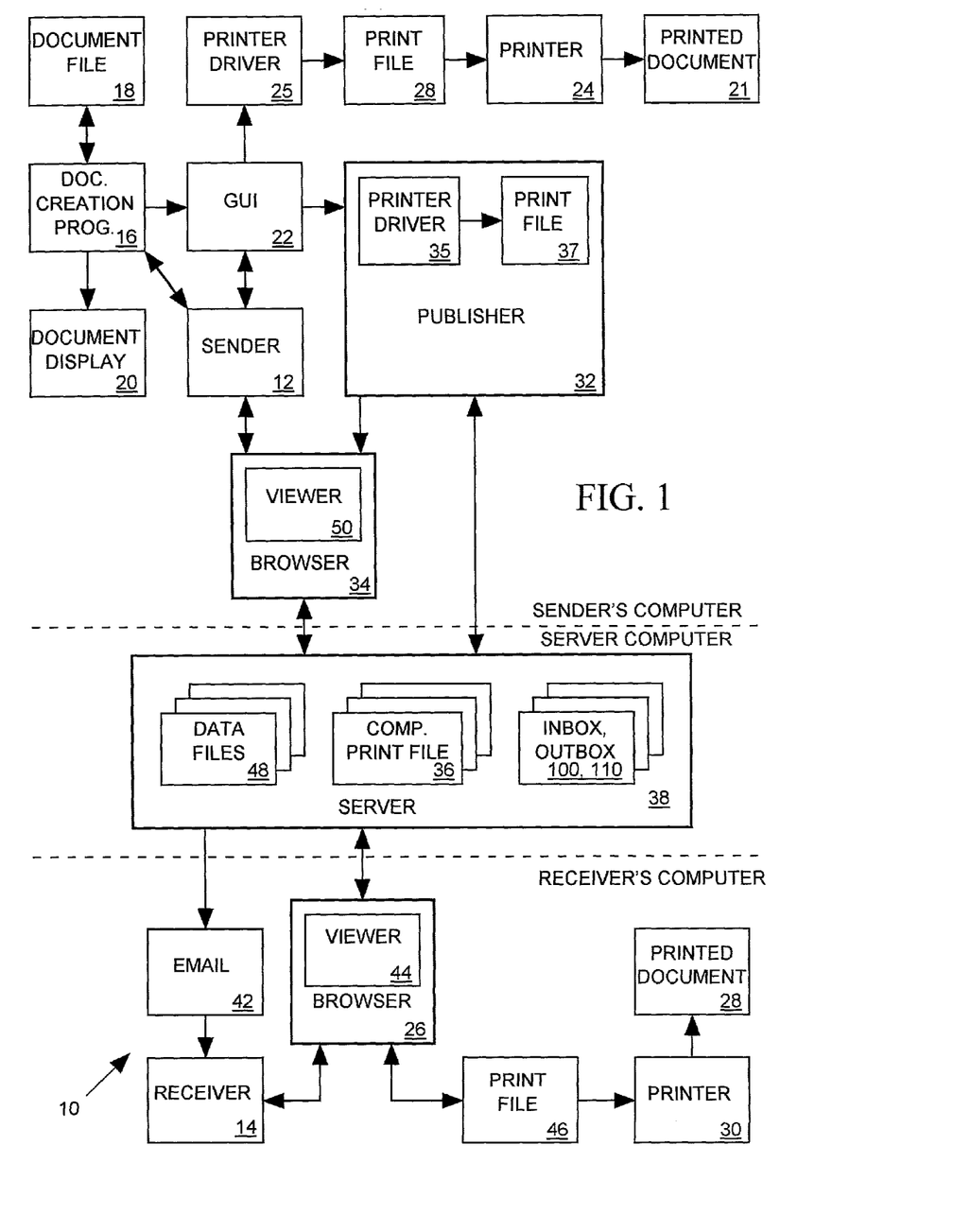
FIG. 1 is a data flow diagram illustrating a document delivery system in accordance with the invention.

FIG. 1 illustrates a document delivery system 10 in accordance with the invention for permitting users to transmit documents to one another via a computer network. For example, a user (sender 12) may use a document creation program 16 such as a word processor or graphics program to create and store a document in the sender's computer in the form of a document file 18. Document creation program 16 may produce a display 20 of the document on a computer monitor. When sender 12 wants a printed version 21 of the document, sender 12 invokes a print procedure of a graphical user interface (GUI) 22 to tell it to print the document on a printer 24. GUI 22 then sends the document file 18 to a printer driver 25 which creates and sends to printer 24 a print file 28 containing commands for creating printed document 21 in a format (suitably Hewlett Packard PCL) understood by printer 24. Printer 24 then generates the printed document 21.

The present invention allows sender 12 to provide a copy of the document to the computer of another user (receiver 14) via a network (e.g. an internet or an intranet) so that receiver 14 can view the document via a browser 26 running on the receiver's computer and can generate a printed version of the document 29 via the receiver's printer 30. The sender's computer sends the document file to a server computer 38 rather than directly to the receiver's computer. Server computer 38 stores the document file and then sends an email message 42 to the receiver's computer indicating that a document is available at a particular network address, such as for example, a uniform resource locator (URL) address. Receiver 14 may then use browser 26 to download the document file from server 38. The document is then displayed by a viewer plug-in 44 to the receiver's browser 26 which can also print the document on the receiver's printer 30.

Publish Request Form

To send the document to receiver 14, sender 12 invokes GUI 22 and directs it to "print" to a "publisher" 32 rather than to printer 24. Publisher 32, a program in accordance with the invention running on the sender's computer, includes a printer driver 35 similar to prior art printer driver 25 for producing a print file 37 similar to print file 28. As it generates print file 37, publisher 32 directs a browser 34 running on the sender's computer to a publish request form page on remote server 38 linked to the sender's computer via a network (e.g. internet or intranet) connection.

Figure 2:
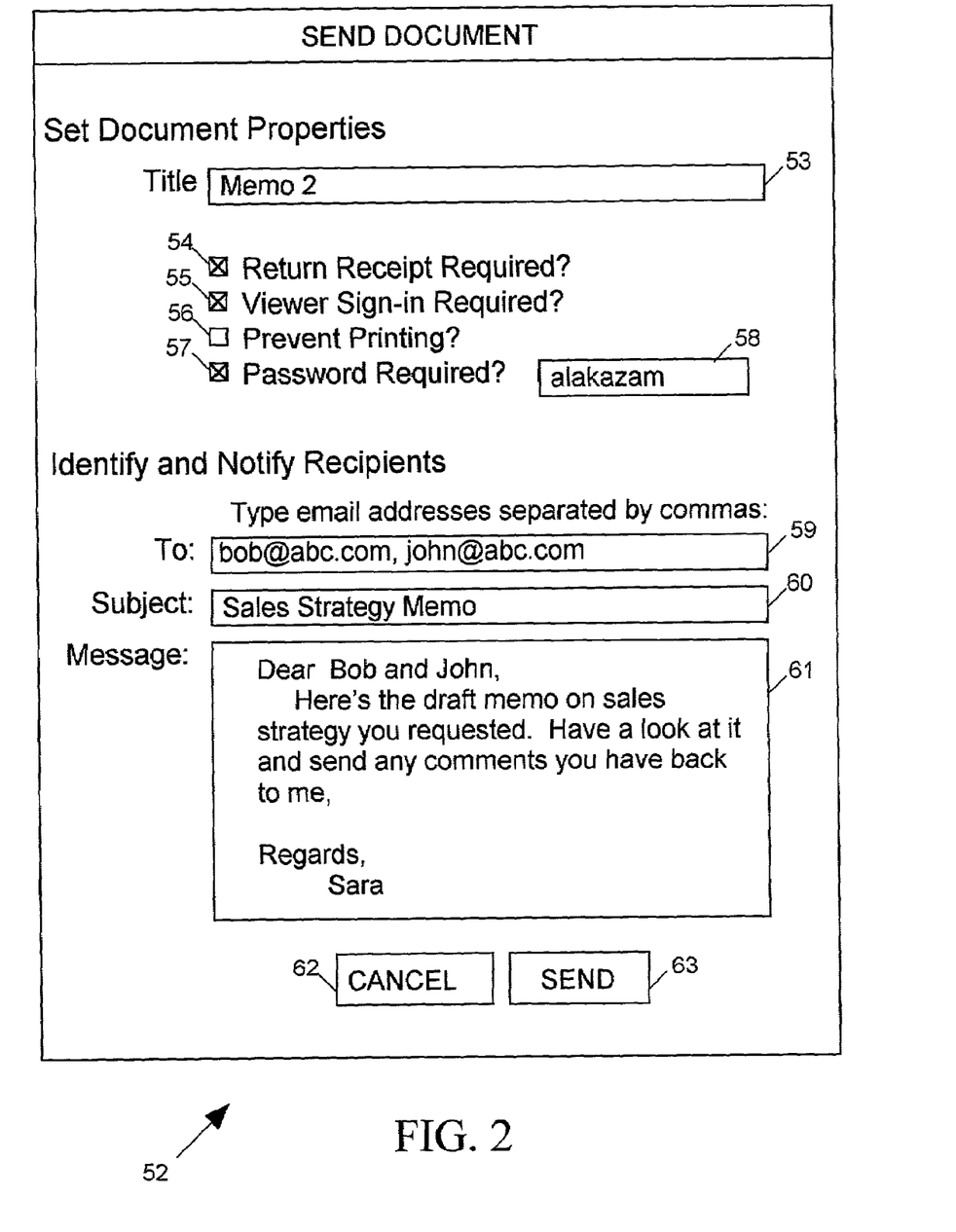
FIG. 2 depicts a publish request form generated by the document delivery system of FIG. 1.

FIG. 2 illustrates the publish request form page 52 the sender's browser 34 displays. Sender 12 types a document title in a text box 53 and checks a set of checkboxes 54–57 to specify various options. A checkbox 54 indicates when sender 12 wants receiver 14 to provide a "return receipt" verifying that the receiver has received and displayed the document. Both sender 12 and receiver 14 must be registered users of the document transmission system, each having a unique user ID and password. Checkbox 55 indicates whether the sender wants receiver 14 to sign into the document delivery system with an ID and password before viewing the document. Checkbox 56 indicates whether sender 12 wants receiver 14 to be able to view the document on a video monitor but does not want receiver 14 to be able to print the document. Checkbox 57 indicates when the sender wants receiver 14 to supply a document password before being allowed to view the document. Sender 12 assigns a document password to the document by entering it into a text box 58.

Sender 12 enters the email addresses of all receivers 14 that are to receive the document into a text box 59. A text box 60 permits sender 12 to enter a subject for an email message to be sent to each receiver 14, and a text box 61 permits the sender 12 to enter text to be included in the email message 42 server 38 is to send to the receiver. When sender 12 has filled in publish request form 52, the sender presses a "Send" button 62 to tell publisher 32 to forward the print file 37 and the data the sender entered into form 52 to server 38 (FIG. 1). Publisher 32 then compresses print file 37 using conventional file compression technology and forwards the compressed print file 36 and the information included in publish request form 52 to server 38. A "Cancel" button 63 allows the sender to optionally cancel the file transmission.

Document Notification Email Message

Figure 3:
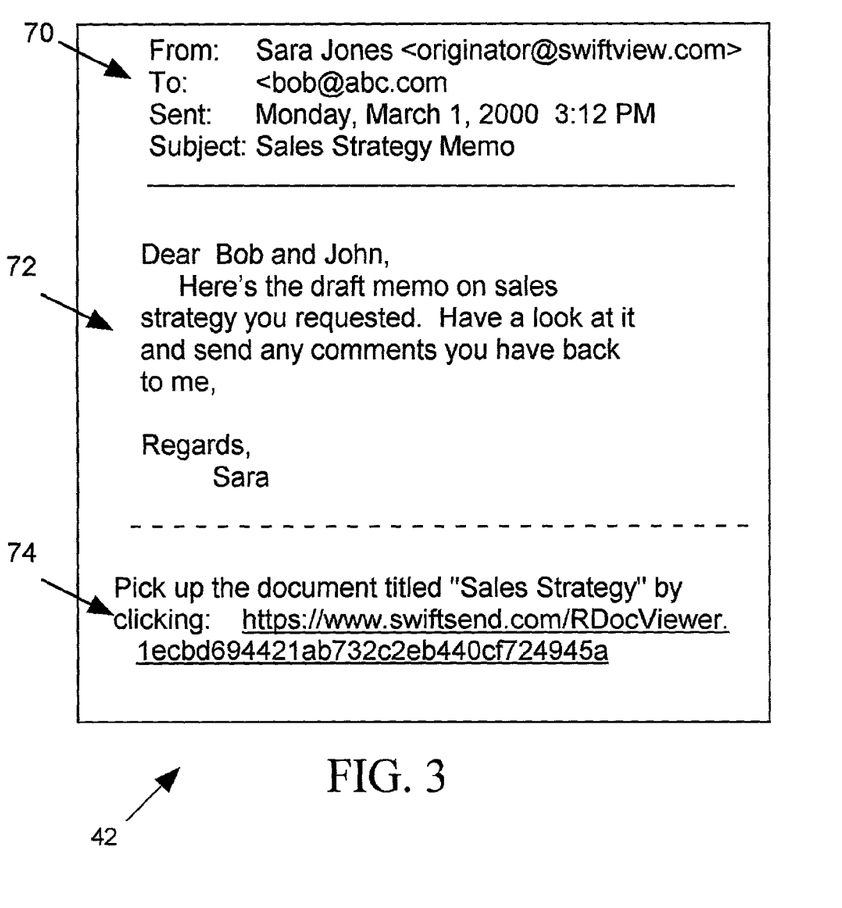
FIG. 3 depicts an email message generated by the document delivery system of FIG. 1.

Server 38 stores the compressed print file 36 at a unique URL address and sends an email message 42 to each receiver 14 whose email address appears in text box 59 of the form. FIG. 3 illustrates an example of email message 42 having a heading 70 indicating the name of sender 12 (e.g., Sara Jones), an email address associated with server 38, the email address of receiver 14 (e.g., bob@abc.com), the time and date the email was sent, and the subject text sender 12 typed into the subject text box 60 of publish request form 52 (FIG. 2). Email message 42 also includes a message section 72 containing the text sender 12 typed into the message text box 61 of publish request form 52 of FIG. 2. A hypertext link 74 contains a URL address of the compressed print file 36 stored on server computer 36. Receiver 14 activates the hypertext link 74 by clicking on it with a mouse, thereby initiating a process described below enabling the receiver to download the document file from server 38 and view and print the document it describes.

Viewer Download Form

Figure 4:
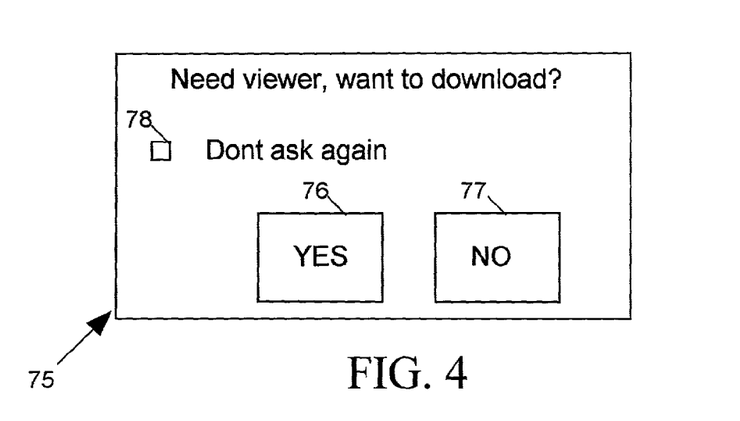
FIG. 4 depicts a viewer download form generated by the document delivery system of FIG. 1.

To permit receiver 14 to view the document, the receiver's browser 26 must have a "viewer" plug-in 44 capable of converting the compressed print file 36 into a display of the document. When receiver 14 clicks on hypertext link 74 included in email message 42 (FIG. 3), thereby sending a URL request to server 38, the server initially responds by returning a "viewer download request" form 75, illustrated in FIG. 4, to be displayed in the receiver's browser 26 (FIG. 1). Browser 26 displays the form only if the viewer is not installed. Viewer download request form 75 includes "Yes" and "No" buttons 76 and 77 allowing receiver 14 to tell browser 26 whether to download and install viewer plug-in 44. When receiver 14 presses Yes button 76, browser 26 downloads viewer plug-in 44 from server 38 and self-installs it. Receiver 14 may then press No button 77 to avoid the viewer download. After the viewer plug-in has been downloaded and installed, or after the receiver presses No button 77, form 75 closes and the process moves on to a next step.

Sign-in Form

Figure 5:
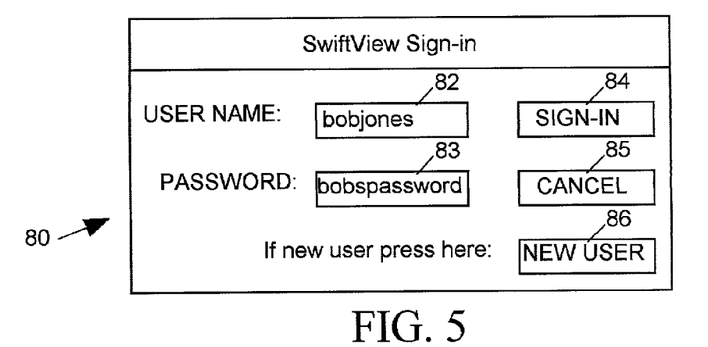
FIG. 5 depicts a user sign-in form generated by the document delivery system of FIG. 1.

When sender 14 has checked the "Viewer Sign-in Required" checkbox 55 in publication request form 52 (FIG. 2), server 38 next displays a sign-in form 80 as illustrated in FIG. 5 on the receiver's browser 26 (FIG. 2). If receiver 14 is already a registered system user, the receiver types his user name and password into a pair of text boxes 82 and 83 and presses a "Sign-in" button 84. Form 80 then forwards the user name and password to server 38. Server 38 keeps a record of each user's user name, password and email address. When the name and password that receiver 14 entered in text boxes 82 and 83 are the correct user name and password for the receiver's email address, then server 38 moves on to a next step of the process as explained below. When either the supplied user name or the password is incorrect, server 38 re-displays box 80 with a message indicating that the name or password is incorrect and allows receiver 14 to try again. When receiver 14 presses a "Cancel" button 85, form 80 disappears from the receiver's browser display and server 38 terminates the process without transferring the document to the receiver's computer.

When receiver 14 is not a registered user, then the receiver may press a "New User" button 86. This tells server 38 to provide a sign-up form allowing receiver 14 to register as a document delivery system user, thereby obtaining a user ID and password.

Document Password Entry Form

Figure 6:
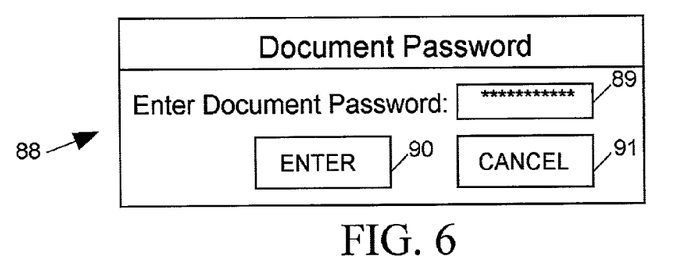
FIG. 6 depicts a document password entry form generated by the document delivery system of FIG. 1.

When sender 12 has checked the "Password Required" checkbox 57 in publish request form 52 (FIG. 2), server 38 next displays a document password entry form 88 as illustrated in FIG. 6 on the receiver's browser 26. The form includes a text box 89 in which receiver 14 types the document password. After pressing an "Enter" button 90, form 88 sends the entered document password back to server 38 which compares it to the document password sender 12 typed into the password text box 58 of publish request form 52 of FIG. 2. When receiver 14 has entered the correct document password, server 38 goes onto the next step of the process. Otherwise server 38 re-displays box 88 with a message indicating that the document password is incorrect and allows receiver 14 to try again. If receiver 14 presses a "Cancel" button 91, form 88 disappears from the receiver's browser display and server 38 terminates the process without transferring the document to the receiver's computer.

Return Receipt Form

Whenever server 12 has indicated that a return receipt request is required by checking box 54 of FIG. 2, server 38 next sends a return receipt form 92 (FIG. 7) to be displayed on the receiver's browser 26. When receiver 14 clicks a Yes button 94, viewer 44 is told to send a return receipt to server 38, but only after viewer 44 has thereafter successfully received the compressed print file 36 and has successfully produced a display of the document on the viewer's browser. Thus the return receipt verifies that viewer has not only received the document file but has successfully displayed an image of the document it describes. The return receipt verification data is in the form of an encoded network address (URL code) viewer 44 sends to server 38. Server 38 does not return a page to browser 26 in response to that URL code but instead interprets it as a return receipt indicating that particular receiver's viewer 44 has successfully displayed the document. Server 38 thereafter logs the date and time the return receipt was received as log data in a sender's outbox page 140 as described below so that sender 12 can determine whether and when viewer 14 actually displayed the document.

Figure 7:
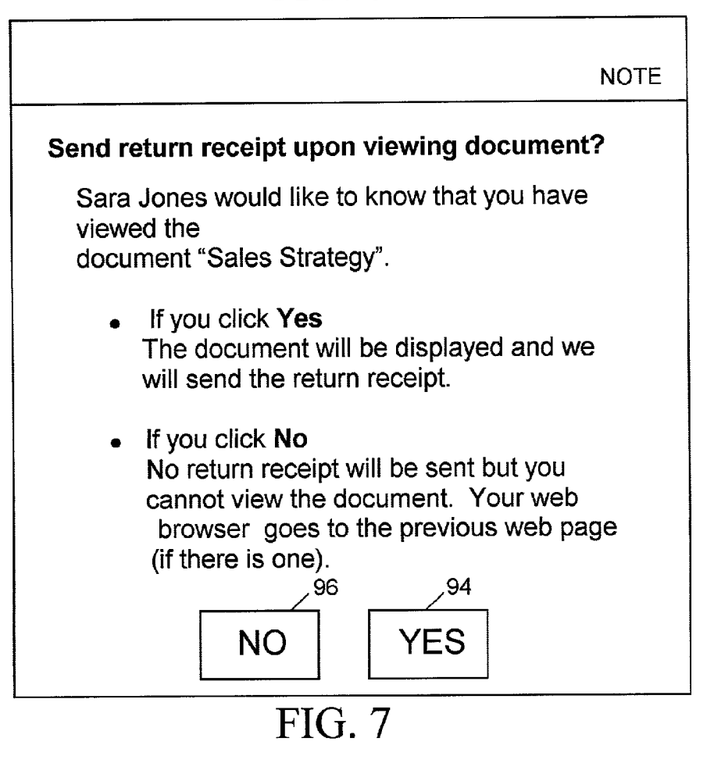
FIG. 7 depicts a return receipt form generated by the document delivery system of FIG. 1.

When receiver 14 chooses to press a "No" button 96 on the return receipt form 92, the print file is not forwarded to the receiver's viewer 44 and no return receipt is sent to server 38 and server 38 does not create a log entry in the sender's outbox page 140.

Plug-in Viewer Window

After receiver 14 has clicked the hypertext reference 74 to the document in email message 42 (FIG. 3), after browser 26 has downloaded the viewer plug-in 44 (if necessary), and after receiver 14 has filled out forms 80, 88 and or 92 (when sender 12 has required them), server 38 forwards the compressed print file 36 to the receiver's browser 26. Viewer plug-in 44 then opens a window in browser 26 and displays the document defined by the compressed print file 36. When a return receipt was requested, viewer 44 sends a URL address code back to server 38 to indicate when it has displayed the document.

Figure 8:
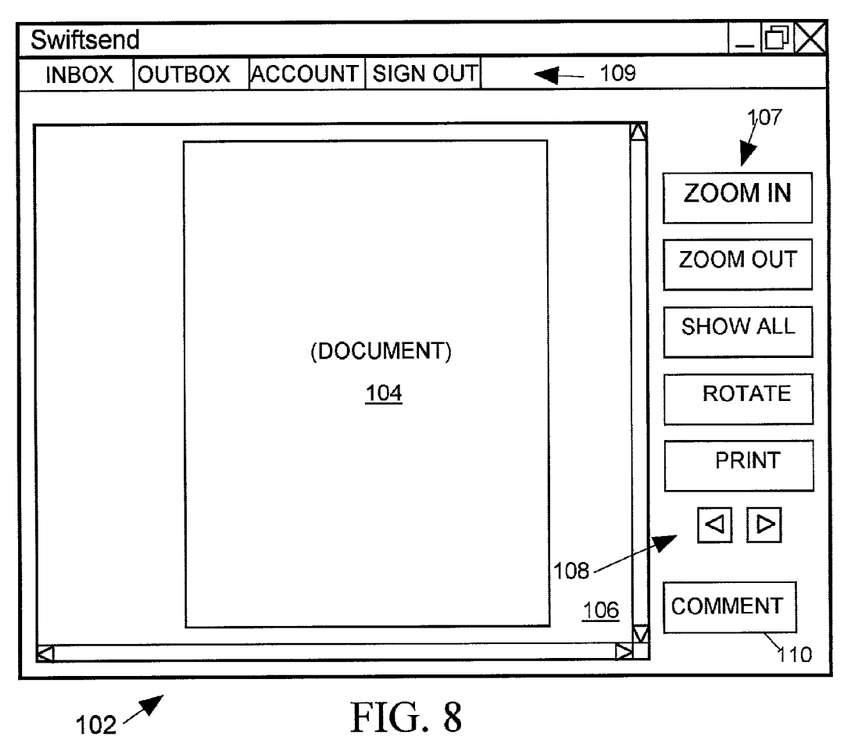
FIG. 8 depicts a display produced by the browser viewer plug-in of the receiver's computer depicted in FIG. 1.

FIG. 8 illustrates a display 102 that plug-in viewer 44 produces within the receiver's browser 26. The document image 104 appears in a window 106. A set of buttons 107 permit receiver 14 to expand ("Zoom In") or decrease ("Zoom Out") the document size, to adjust the document size to fit window 106 ("Show All"), to rotate the document ninety degrees ("Rotate"), or to print the document ("Print"). The user may also move from page-to-page within a multiple-page document using a pair of arrow buttons 108. Menu buttons 109 permit receiver 14 to navigate to the receiver's inbox page, outbox page or account management page, or to log-off (sign out) from the document delivery service.

Once browser 26 has successfully displayed the document, receiver 14 may press the Print button to tell viewer 44 to send a decompressed version 46 of the compressed print file 36 to the receiver's printer 30 so that it can print a copy of the document 29. Since print file 46 is substantially identical to the print file 28 that the sender's printer driver 26 would produce, the printed documents 21 and 29 will be substantially identical, provided printers 24 and 30 respond to the same printer command language. When the receiver's printer 30 requires a different command language, viewer 44 translates the document print file to the appropriate printer command language when producing print file 46.

Comment Form

Figure 9:
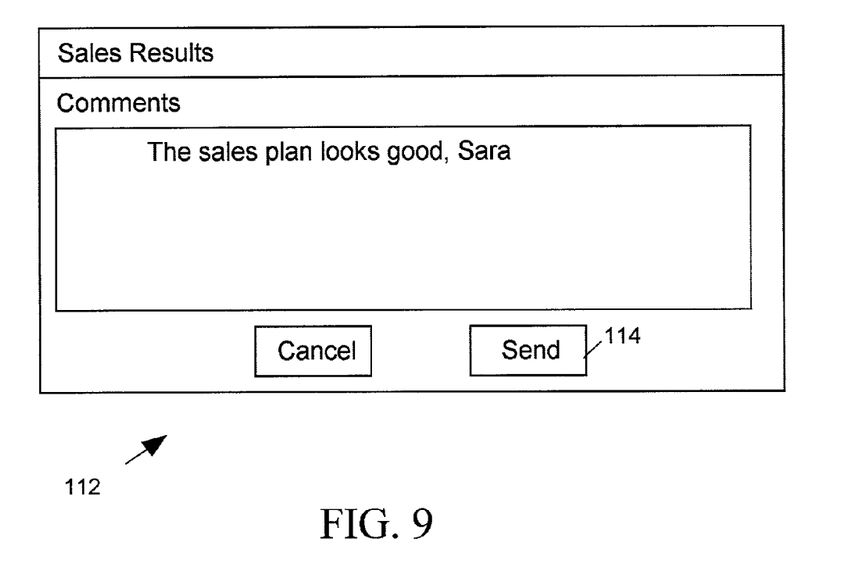
FIG. 9 depicts a comment form generated by the document delivery system of FIG. 1.

When receiver 14 clicks a "Comment" button 110 included in the viewer display, a comment form 112 (FIG. 9) appears on the display. Receiver 14 may type comments into the form and send them back to server 38 by pressing a "Send" button 114. As described below, server 38 allows the sender to access the comment via the sender's outbox page 140.

Inbox Page

Figure 10:
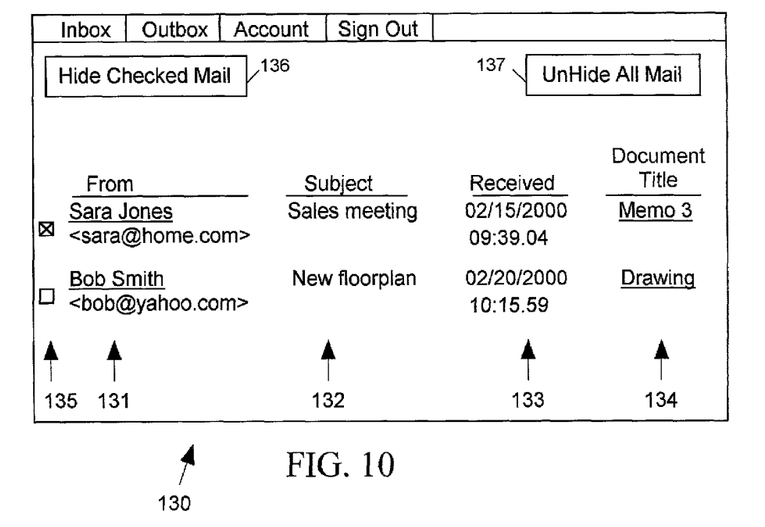
FIG. 10 depicts an inbox display produced by the browser viewer plug-in of the receiver's computer depicted in FIG. 1.

FIG. 10 illustrates an inbox page 130 server 38 maintains to which receiver 14 may navigate via browser 26 after signing in. Inbox page 130 lists in column 131 names and email addresses of senders having print files 36 currently stored on server 38 for which receiver 14 has previously received an email message (FIG. 3). The subject of the email message appears in column 132 and the date and time receiver 14 originally received the email message appear in column 133. Receiver 14 may click on the sender name (column 131) to review the email message. When receiver 14 clicks on a hypertext link in column 134 indicating the document title, server 38 downloads the document's compressed print file 36 to the receiver's browser viewer 44 which then displays the document.

Server 38 removes the entry for a document from the receiver's inbox 130 whenever the server ceases to store the document's compressed print file 36. In the meantime, when receiver 14 wishes to prevent the entry for a document from appearing in the receiver's inbox, the receiver checks a checkbox in a column 135 for that document and then clicks a "Hide Checked Mail" button 136. Server 38 then hides all checked entries from view. Receiver 14 can restore all hidden document entries to the inbox list by clicking an "Unhide All Mail" button 137.

Outbox Page

Figure 11:
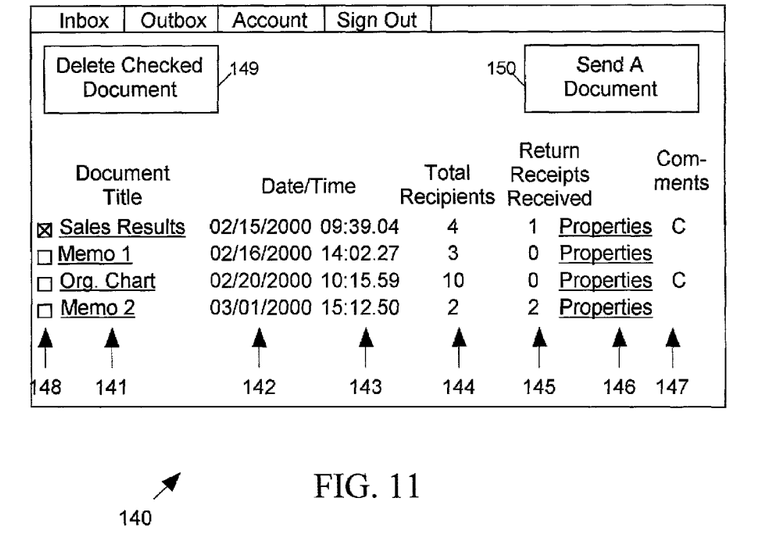
FIG. 11 depicts an output display produced by the browser viewer plug-in of the sender's computer depicted in FIG. 1.

FIG. 11 illustrates an outbox page 140 maintained by server 38 that sender 12 may access via the sender's browser 34 after signing in. Outbox page 140 lists all of the sender's compressed print file documents server 38 currently stores. A column 141 of the document lists the document titles, columns 142 and 143 indicate the date and time the document was sent to the server, column 144 indicates the number of receivers to which each document was directed. Column 145 indicates the number of receivers that received a return receipt request and have not yet sent return receipts. Column 147 displays a "C" in the entry for any document for which a receiver has sent a comment. A column 146 includes a separate "details" hypertext link for each document that enables sender 12 to jump to a page containing information about the document. Sender 12 may delete a document from the server 38 by checking a check box 148 next to the document entry and pressing a "Delete Checked Document" button 149. Sender 12 may also add new recipients to a document by pressing a "Send Checked Document" button 150. This causes server 38 to send a new publication request form 52 (FIG. 2) to the sender's browser enabling the sender to specify other recipients to receive an email notification regarding the document. Since the document file 36 already resides on server 38 it is not necessary for the sender's computer to upload the document file to the server.

Details Page

Figure 12:
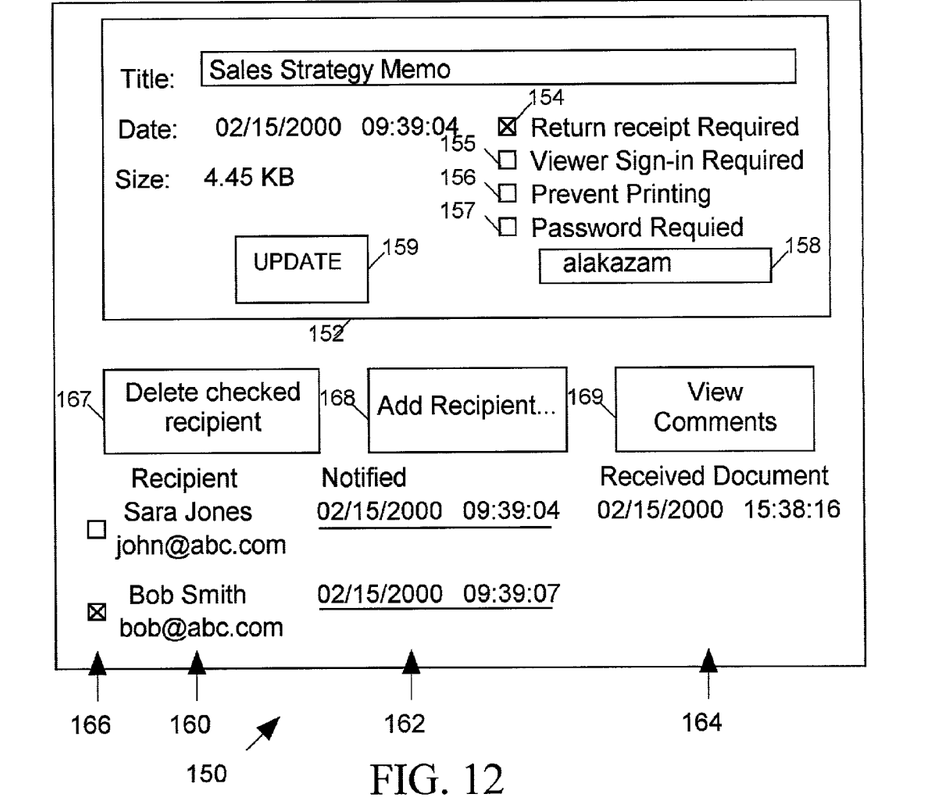
FIG. 12 depicts a details display produced by the browser viewer plug-in of the sender's computer depicted in FIG. 1.

FIG. 12 illustrates a typical details page 152 including a box 154 containing the title of the document, the date and time it was sent to server 38, the size of the document, and check boxes 155-158 indicating whether the sender has requested a return receipt, viewer sign in, document printing disable or password, and showing the document password in a text box 159. Sender 12 can change those requirements by checking or un-checking boxes 155-158 and changing the password in box 159 and then pressing an "Update" button 160.

The name and email address of each person designated to receive the document appears in column 161 and the date and time at which that person was sent notification email appears in column 162. The date and time at which a return receipt was received, if any, appears in column 164. Sender 12 checks a check box 166 and presses a "Delete Checked Recipient" button 167 to remove the a person from the list of authorized recipients, thereby removing that document from that person's inbox and preventing him or her from accessing the document again. Pressing an "Add Recipient" button 168 produces a display of a document request form (FIG. 2) which allows the sender to send new email notifications to one or more additional receivers to permit them to access the document.

Figure 13:
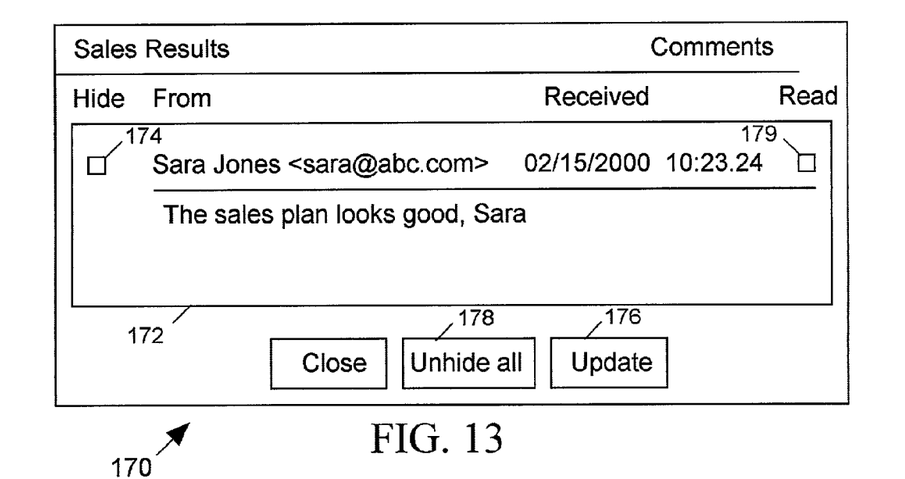
FIG. 13 depicts a comments display produced by the browser viewer plug-in of the sender's computer depicted in FIG. 1.

A "View Comments" button 169 jumps the sender to a comments page 170 as illustrated in FIG. 13 including a separate comment box 172 for each comment a receiver has returned regarding the document. Comment box 172 indicates the name and email address of the person sending the comment, and the date and time the comment was received. It also contains the text of the comment. Sender 12 may check a check box 174 and press an "Update" button 176 to hide comment box 172. An "Unhide All" button 179 restores all hidden comment boxes 172 to the page. The sender presses a "Read" check box 180 and presses the Update button 176 to indicate that the reader has read the comment.

Thus has been shown and described a document delivery system 10 which enables a sender 12 to not only send a document to a receiver 14 via a computer network, it also enables the sender to determine whether receiver 14 has actually viewed the document since viewer plug-in 44 does not send a return receipt until the document has been displayed on browser 26.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A method for transmitting a document from a sender computer to a receiver computer via a computer network linking the sender computer and the receiver computer to a server computer, wherein the sender computer is operated by a sender, wherein the receiver computer is operated by a receiver, the method comprising the steps of:

a. generating a document file describing the document on the sender computer;
   b. sending the document file from the sender computer to the server computer;
   c. sending email to the receiver computer containing a hypertext link that the receiver activates to send a reference to the document file to the server computer;
   d. sending the document file from the server computer to the receiver computer after the server computer receives the reference to the document file from the receiver computer;
   e. processing the document file sent to the receiver computer to generate a display of an image of the document in a browser window on the receiver computer; and
   f. sending verification data from the receiver computer to the server computer indicating that the receiver computer has successfully displayed the image of the document in the browser window,
   wherein the receiver computer returns the verification data to the server computer as an encoded network address.

2. The method In accordance with claim 1 further comprising the steps of:

g. Storing log data on the server computer indicating when the receiver computer returned the verification data to the server computer indicating that the receiver computer has successfully displayed in the browser window the image ci the document referenced by the hypertext link; and
   h. providing the sender computer with access to the log data via the computer network.

3. The method in accordance with claim 1 further comprising the steps of:

g. transmitting a comment file containing comments generated by the receiver from the receiver computer to the server computer, wherein the comment file references the document file;
   h. storing the comment file on the server computer; and
   i. providing the sender computer with access to the comment file via the computer network.

4. The method in accordance with claim 1 further comprising the step of:

g. Transmitting a publish request from the sender computer to the server computer wherein the publish request identifies the receiver computer.

5. The method in accordance with claim 4 further comprising the step of:
  h. storing the document file in the server computer and assigning a network address to the document file stored on the server computer, wherein the hypertext link references the assigned network address.

6. The method in accordance with claim 1 further comprising the step of:
  g. sending a document password entry form from the server computer to the receiver computer after the server computer receives the reference to the document file from the receiver computer, wherein the receiver enters into the document password entry form a document password associated with the document that the receiver computer sends to the server computer prior to step d.

7. A method for transmitting a document from a sender computer to a receiver computer via a computer network linking the sender computer and the receiver computer to a server computer, wherein the sender computer is operated by a sender, wherein the receiver computer is operated by a receiver, the method comprising the steps of:
  a. Entering a document file describing the document on the sender computer;
  b. sending the document file from the sender computer to the server computer;
  c. sending email to the receiver computer containing a hypertext link that the receiver activates to send a reference to the document file to the server computer;
  d. sending the document file from the server computer to the receiver computer after the server computer receives the reference to the document file from the receiver computer;
  e. processing the document file sent to the receiver computer to generate a display of an image of the document in a browser window on the receiver computer;
  f. sending verification data from the receiver computer to the server computer indicating that the receiver computer has successfully displayed the image of the document is the browser window, and
  g. sending a document password entry form from the server computer to the receiver computer after the server computer receives the reference to the document file from the receiver computer, wherein the receiver enters into the document password entry form a doormen password associated with rho document that the receiver computer sends to the server computer prior to step d, and
  h. sending a user sign in form from the server computer to the receiver after the server computer receives the reference to the document file from the receiver computer at step c, wherein the user enters into the sign-in form a user name and a user password that the receiver computer sends to the server computer prior so step d.

8. The method in accordance with claim 1 wherein step a comprises generating on the sender computer a print file for directing a printer to print the document, and processing the print file to generate the document file.

9. The method in accordance with claim 1 wherein the document file is a print file and the method further comprising the step of:
  g. transmitting a publish request from the sender computer to the server computer, wherein the publish request identifies the receiver computer, wherein the publish request indicates that the receiver computer is to he prevented from sending the document file to a printer.

10. A method for transmitting a document from a sender computer to a receiver computer via a computer network linking the sender computer and the receiver computer to a server computer, wherein the sender computer is operated by a sender, wherein the receiver computer is operated by a receiver, the method comprising the steps of:
  a. generating a document file describing the document on the sender computer;
  b. sending the document file from the sender computer to the server computer;
  c. sending email to the receiver computer containing a hypertext link that the receiver activates to send a reference to the document file to the server computer;
  d. sending the document file from the server computer to the receiver computer after the server computer receives the reference to the document file from the receiver computer;
  e. processing the document file sent to the receiver computer to generate a display of an image of the document in a browser window on the receiver computer; and
  f. sending verification data from the receiver computer to the server computer indicating that the receiver computer has successfully displayed the image of the document in the browser window,
  g. transmitting a publish request from the sender computer to the server computer, wherein the publish request identifies the receiver computer, wherein the publish request indicates that the receiver computer is to be prevented from sending the document file to a printer,
  wherein step a comprises generating on the sender computer a print file for directing a printer to print the document, and then compressing the print file to generate the document file and
  wherein step e comprises decompressing the document file to produce the print file and then processing the print file to generate the display of the image of the document in the browser window on the receiver computer.

11. The method in accordance with claim 1 further comprising the steps of:
  g. assigning to the document file a document password generated by the sender, and
  h. transmitting the document password to the server computer.

12. The method in accordance with claim 11 further comprising the steps of:
  i. providing a document password entry form to the receiver computer in which the receiver enters the document password,
  j. conveying the document password entered into the document password entry form to the server computer, and
  wherein step g is carried out only after the server computer receives the document password from the receiver computer.

13. A method for transmitting a document file describing a document from a sender computer to a receiver computer via a computer network linking the sender computer and the receiver computer to a server computer, wherein the sender computer is operated by a sender, wherein the receiver computer is operated by a receiver, wherein the receiver computer includes a monitor viewable by the receiver, the method comprising the stops of:

a. transmitting the document file via the computer network from the sender computer to the server computer;
b. storing the document file on the server computer and assigning the document file a unique network address;
c. transmitting an email message via the computer network to the receiver computer, wherein the email message includes a hypertext link to the document files assigned network address;
d. displaying the email message on the receiver computer monitor so that the receiver may view it and activate the hypertext link whereby the receiver computer returns the document file's network address to the server computer;
e. transmitting the document file from the server computer to the receiver computer via the computer network following the receiver's activation of the hypertext link; and
f. providing viewer software running on the receiver computer for generating a display on the receiver computer monitor of the document described by the document file when received by the receiver computer;
wherein when the viewer software has successfully displayed the document it automatically returns verification data in the form of an encoded network address to the server computer via the computer network verifying that the document has been successfully displayed; and
g. prior to step a, transmitting a publish request from the sender computer to the server computer wherein the publish request identifies the receiver that is to receive the email message at step c,
wherein the publish request transmitted in step g indicates that the receiver must sign on to the server computer by transmitting, prior to step e, a user name and a user password to the server computer via the computer network in order to receive the document file at step e.

14. The method in accordance with claim 13 wherein step e comprises the sub-steps of:
e1. verifying that the receiver is signed on to the server computer, and
e2. thereafter transmitting the document file from the server computer to the receiver computer via the computer network following the receiver's activation of the hypertext link.

15. The method in accordance with claim 14 further comprising the steps of:
h. assigning to the document file a document password generated by the sender; and
i. prior to step b, transmitting the document password to the server computer.

16. The method in accordance with claim 15 wherein step e comprises the substeps of:
e1. providing a document password entry form to the receiver computer in which the receiver enters the document password;
e2. conveying the document password entered into the document password entry form from the receiver computer to the server computer; and
e3. Transmitting the document file from the server computer to the receiver computer via the computer network at stop e only after the server computer receives the document password from the receiver computer.

17. A method for transmitting a document file describing a document from a sender computer to a receiver computer via a computer network linking the sender computer and the receiver computer to a server computer, wherein the sender computer is operated by a sender, wherein the receiver computer is operated by a receiver, wherein the receiver computer includes a monitor viewable by the receiver, the method comprising the steps of:
a. transmitting the document file via the computer network from the sender computer to the server computer;
b. storing the document file on the server computer and assigning the document file a unique network address;
c. transmitting an email message via the computer network to the receiver computer, wherein the email message includes a hypertext link to the document files assigned network address;
d. displaying the email message on the receiver computer monitor so that the receiver may view it and activate the hypertext link whereby the receiver computer returns the document file's network address to the server computer;
e. transmitting the document file from the server computer to the receiver computer via the computer network following the receiver's activation of the hypertext link;
f. providing viewer software running on the receiver computer for generating a display on the receiver computer monitor of the document described by the document file when received by the receiver computer;
wherein when the viewer software has successfully displayed the document, it automatically returns verification data in the form of an encoded network address to the server computer via the computer network verifying that the document has been successfully displayed; and
g. prior to step a, transmitting a publish request from the sender computer to the server computer wherein the publish request identifies the receiver that is to receive the email message at step c,
wherein the document file is a print file and wherein the publish request indicates whether the receiver computer is to be prevented from sending the document file to a printer.

* * * * *

UNITED STATES PATENT AND TRADEMARK OFFICE
CERTIFICATE OF CORRECTION

| | |
|---|---|
| PATENT NO. | : 7,243,127 B2 |
| APPLICATION NO. | : 09/974624 |
| DATED | : July 10, 2007 |
| INVENTOR(S) | : Alfred T. Tabayoyon et al. |

Page 1 of 1

It is certified that error appears in the above-identified patent and that said Letters Patent is hereby corrected as shown below:

In the Specification

Col. 7, line 44, delete "remove the a person", insert --remove a person--.

In the Claims

Col. 8, line 43, in Claim 2, delete "method In accordance", insert --method in accordance--.

Col. 8, line 49, in Claim 2, delete "image ci the", insert --image of the--.

Col. 9, line 23, in Claim 7, delete "a. Entering a", insert -- a. generating a--.

Col. 9, line 42, in Claim 7, delete "document is the", insert --document in the--.

Col. 9, lines 47-48, in Claim 7, delete "a doormen password", insert --a document password--.

Col. 9, line 48, in Claim 7, delete "with rho document", insert --with the document--.

Col. 10, line 67, in Claim 13, delete "the stops of", insert --the steps of--.

Col. 12, lines 22-23, in Claim 17, delete "document files assigned", insert --document file's assigned--.

Signed and Sealed this
Eighteenth Day of November, 2014

Michelle K. Lee
*Deputy Director of the United States Patent and Trademark Office*